US009552135B2

(12) United States Patent
Tarmey et al.

(10) Patent No.: US 9,552,135 B2
(45) Date of Patent: Jan. 24, 2017

(54) SECURITY SYSTEM AND METHOD WITH MULTISTATE ALERT USER INTERFACE

(71) Applicant: Sensormatic Electronics, LLC, Boca Raton, FL (US)

(72) Inventors: Stephen Tarmey, Leominister, MA (US); Miguel Galvez, Salem, NH (US); Robert Pearson, Wellesley, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 13/740,973

(22) Filed: Jan. 14, 2013

(65) Prior Publication Data

US 2014/0197959 A1 Jul. 17, 2014

(51) Int. Cl.

| | |
|---|---|
| *G08B 3/00* | (2006.01) |
| *G08B 5/00* | (2006.01) |
| *G08B 7/00* | (2006.01) |
| *G06F 3/0481* | (2013.01) |
| *G08B 25/14* | (2006.01) |
| *G08B 13/196* | (2006.01) |

(52) U.S. Cl.
CPC ..... *G06F 3/04817* (2013.01); *G08B 13/19682* (2013.01); *G08B 13/19691* (2013.01); *G08B 25/14* (2013.01); *G08B 13/19645* (2013.01)

(58) Field of Classification Search
CPC ........ H04L 67/12; H04L 67/025; H04L 41/22; H04L 12/2003; H04L 2012/2841; H04L 43/045; H04L 12/2818; H02J 13/001; H02J 2003/143; G06F 21/36; G06F 21/552; G06F 9/445
USPC ....... 340/691.1, 691.4, 691.6, 815.4, 815.69; 715/764, 716; 709/202, 203, 223, 224, 219
See application file for complete search history.

(56) References Cited

U.S. PATENT DOCUMENTS

| | | | |
|---|---|---|---|
| 5,751,965 A * | 5/1998 | Mayo et al. | 709/224 |
| 5,794,178 A | 8/1998 | Caid et al. | |
| 6,456,306 B1 * | 9/2002 | Chin et al. | 715/810 |
| 6,496,209 B2 | 12/2002 | Horii | |

(Continued)

FOREIGN PATENT DOCUMENTS

WO 2012/000523 A1 1/2012

OTHER PUBLICATIONS

International Search Report and Written Opinion of the International Searching Authority mailed Apr. 2, 2014 from counterpart International Application No. PCT/US2013/074573, filed Dec. 12, 2013.

(Continued)

*Primary Examiner* — Travis Hunnings
(74) *Attorney, Agent, or Firm* — HoustonHogle LLP

(57) ABSTRACT

A security system, system user interface, and method for displaying status information from security devices in a networked security system using a multistate alert user interface. The security system supports different features in icons associated with the security devices, displayed on a graphical user interface. This provides operators with the ability to display status information from security devices, such as alert information comprising one or more alerts, by displaying the icons on a topology map of the graphical user interface. In this way, the operator can determine at a glance the number and type of alert information from the topology map without the need to perform additional selection and navigation steps within the graphical user interface.

21 Claims, 8 Drawing Sheets

(56) References Cited

U.S. PATENT DOCUMENTS

| | | | |
|---|---|---|---|
| 8,209,719 | B2 | 6/2012 | White |
| 8,539,545 | B2* | 9/2013 | Kartha et al. ............... 726/1 |
| 2003/0025599 | A1 | 2/2003 | Monroe |
| 2009/0113328 | A1 | 4/2009 | Leonard |
| 2009/0217206 | A1 | 8/2009 | Liu et al. |
| 2010/0023865 | A1 | 1/2010 | Fulker et al. |
| 2010/0083169 | A1* | 4/2010 | Athsani et al. ............ 715/810 |
| 2011/0067106 | A1* | 3/2011 | Evans et al. ................ 726/23 |
| 2012/0066608 | A1* | 3/2012 | Sundermeyer et al. ..... 715/738 |
| 2012/0331109 | A1* | 12/2012 | Baum et al. ................ 709/219 |

OTHER PUBLICATIONS

International Preliminary Report on Patentability, mailed Apr. 9, 2015, from counterpart International Application No. PCT/US2013/074573, filed Dec. 12, 2013.

\* cited by examiner

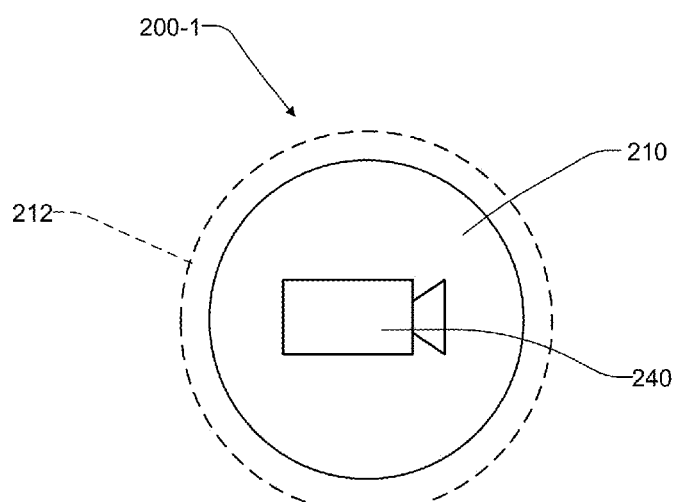
FIG. 3A
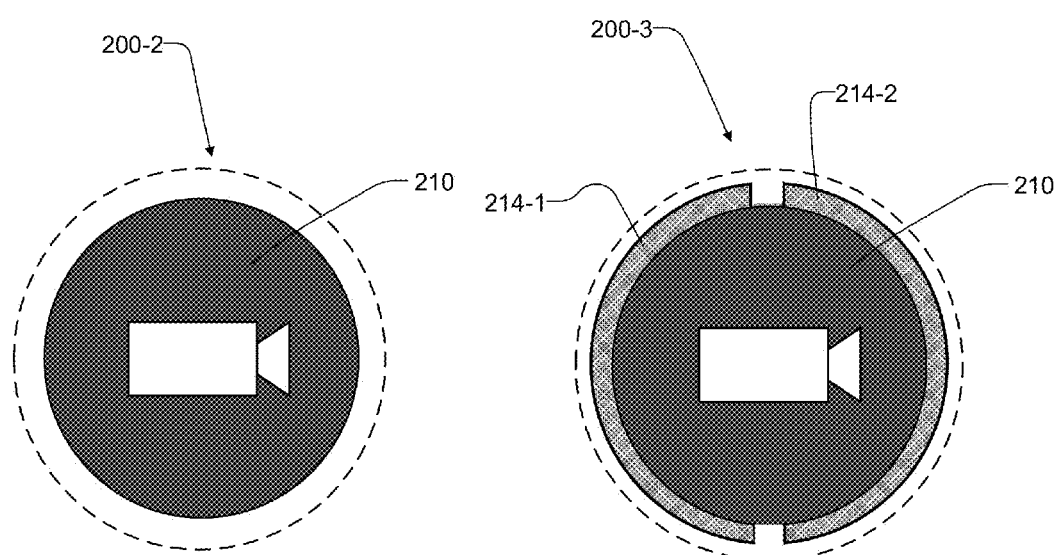
FIG. 3B
FIG. 3C

SECURITY SYSTEM AND METHOD WITH MULTISTATE ALERT USER INTERFACE

BACKGROUND OF THE INVENTION

Security systems are used to help protect people, property, and reduce crime for homeowners and businesses alike and have become an increasingly cost-effective tool to reduce risk. These systems have multiple components, such as workstations, display devices, and security devices that communicate over a security network. These security devices include monitoring points, video cameras for capturing live video of an area of interest, network video recorders for recording and playback of previously captured events, physical access control devices such as key pads and card readers, and a variety of sensor devices installed within and at entry and exit points for premises.

Security devices send status information periodically and in response to events. These events include changes in the environment the devices were designed to detect, such as a when a window sensor detects that the window has been opened or that the window sensor itself has been tampered with, and events related to device operation, such as when a sensor's battery voltage is low, or when a video camera indicates that condensation has occurred on its lens. When the status changes, the devices send their status information to a receiving entity such as a security control system so that the security control system can record the event. Display devices are also used to present the status information to an operator in graphical user interfaces ("GUI"). The graphical user interfaces typically include icons associated with each of the security devices on a topology map. The topology map displays a device-specific icon for each security device. The topology map typically displays a virtual floor plan containing physical features of an area being monitored, and displays icons for security devices on the security network for that area.

One of the ways the security system notifies operators of changes in the security network is by updating the icons associated with security devices on the topology map of the GUI in response to status information sent by the security devices.

SUMMARY OF THE INVENTION

Status information from security devices include state information and alert information. State information is typically limited to an indication of whether a security device is either offline or online, but security devices support different alert information for each device. For example, door sensors support alert information such as an indication that a door has been opened, that the sensor itself has been tampered with, or that force was used in an attempt to open a door. In addition, each type of alert information is typically supported independently of the other, so a security device can send different alerts depending on the circumstances, and simultaneously. In general, a security device sends alert information in response to an event or alert condition detected on the security device.

Security devices continue to send alert information associated with an event until the condition that caused the event is removed or the operator administratively disables the alert information. Operators are especially concerned with identifying and analyzing alert information, because these are associated with critical security events that the security system was designed to detect and report.

In user interfaces for current security systems, icons are associated with and identify each security device in the security system, provide a single point of reference for access to details for each security device, and convey high-level indications of changes to security devices. Icons often identify a security device by displaying an image associated with the security device. By selecting a security device's icon, an operator gains access to the security device's details, typically in new windows that the user interface opens in response to the selection. Icons also typically display a different color to indicate a major change to a security device, such as a state change from online to offline.

A user "indicating" an icon is shorthand for describing the act of moving the pointing portion of a pointing device, such as a mouse, over the features of the icons. In contrast, a "selection" of an icon is when an operator performs indication of an icon, and couples this with an additional pointing device action, such as depressing a mouse button ("mouse click") to accomplish the selection.

However, icons displayed on user interfaces in current security systems cannot convey the existence of different alert information from the security devices. They only convey a single indication for an alert condition, regardless of how many alerts are active. For example, operators of current systems typically configure the icons to display a color such as red to indicate the existence of an alert condition on a security device. In one case, however, the icon would display red regardless of whether only one alert, or ten alerts are active on the associated device. As a result, an operator using current security systems cannot determine how many alerts are being sent by the security device, nor their names or alert status values, by viewing the icon for the security device alone.

When security devices send multiple alert information, operators of current security systems must perform additional navigation and selection steps within the GUI to display the number and type of alerts that comprise the alert information for security devices. Selection actions to reveal this information, such as selecting the icons, typically open other windows on the user interface for displaying the information. This can clutter the user interface with windows and detracts from the "at a glance" summary listing of all security devices that a user interface such as topology map with icons associated with security devices provides. Moreover, as the number of monitored areas and associated security devices in a security system increases, the time and effort that an operator must expend to properly detect and analyze alert information increases, which slows the response time for premises security, first responders, and law enforcement.

It is therefore an object of the present invention to present the status information using icons associated with each of the security devices, wherein the icons include multiple features for indicating different alert information from the associated security devices.

In this way, the present invention can display a separate feature for each currently activated alert from the security device. This allows an operator to determine how many activated alerts exist for each security device in the security system "at a glance," without the need to examine the security devices in more detail.

In general, according to one aspect, the invention features a security system, comprising a security network, security devices that transmit status information via the security network, and a display device that presents the status information using icons associated with each of the security devices, wherein the icons include multiple features for indicating different alert information from the associated security devices.

In embodiments, the security devices in the security system include one or more key card readers, network video recorders, video cameras, monitoring points, and door sensors. The security system can also include security devices such as generic security sensors that mount on windows and doors, and motion sensors.

In further details of the embodiments, the icons include inner status regions for displaying the status information from the associated security devices. Inner regions include a device state region for displaying an image associated with a security device, and a status region for displaying an indication associated with status information for a security device.

The multiple features of the icons are preferably displayed in outer alert regions for displaying the alert information, such as alert segments. The alert segments display preferably as arcs, or as line segments. In another aspect, the present invention displays the multiple features of the icons as icons, images of which represent the alert information. Preferably, the security system presents details of the alert information from the associated security devices on the display device in response to a user indicating the icons on the display device. One way the operator provides the user indication is by operating a pointing device to hover over the features of the icons, and an example way of revealing the details of the alert information is to display a tooltip in response to the pointing device hover operation.

A tooltip is a message that appears when a pointing device such as a mouse is positioned over an icon, image, hyperlink, or other element in a graphical user interface. An operator positions a pointing device such as a mouse to hover over the features of the icons that represent alert information in order to reveal details of the alert information.

In general, according to another aspect, the invention features a graphical user interface for a security system displayed on a display device of a workstation. The graphical user interface comprises a topology map showing a security network and icons associated with security devices on the security network. The icons include multiple features for indicating different alert information from the associated security devices.

In general, according to another aspect, the invention features a method for presenting status information from security devices connected to a security network in a security system. The method comprises displaying icons associated with the security devices on a display device connected to the security network. The status information is presented using the icons associated with each of the security devices, wherein the icons include multiple features for indicating different alert information from the associated security devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 3A, 3B, and 3C are schematic diagrams showing regions of the icons and multiple features of the icons according to the present invention;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

As used herein, the singular forms including the articles: "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

Figure 1:
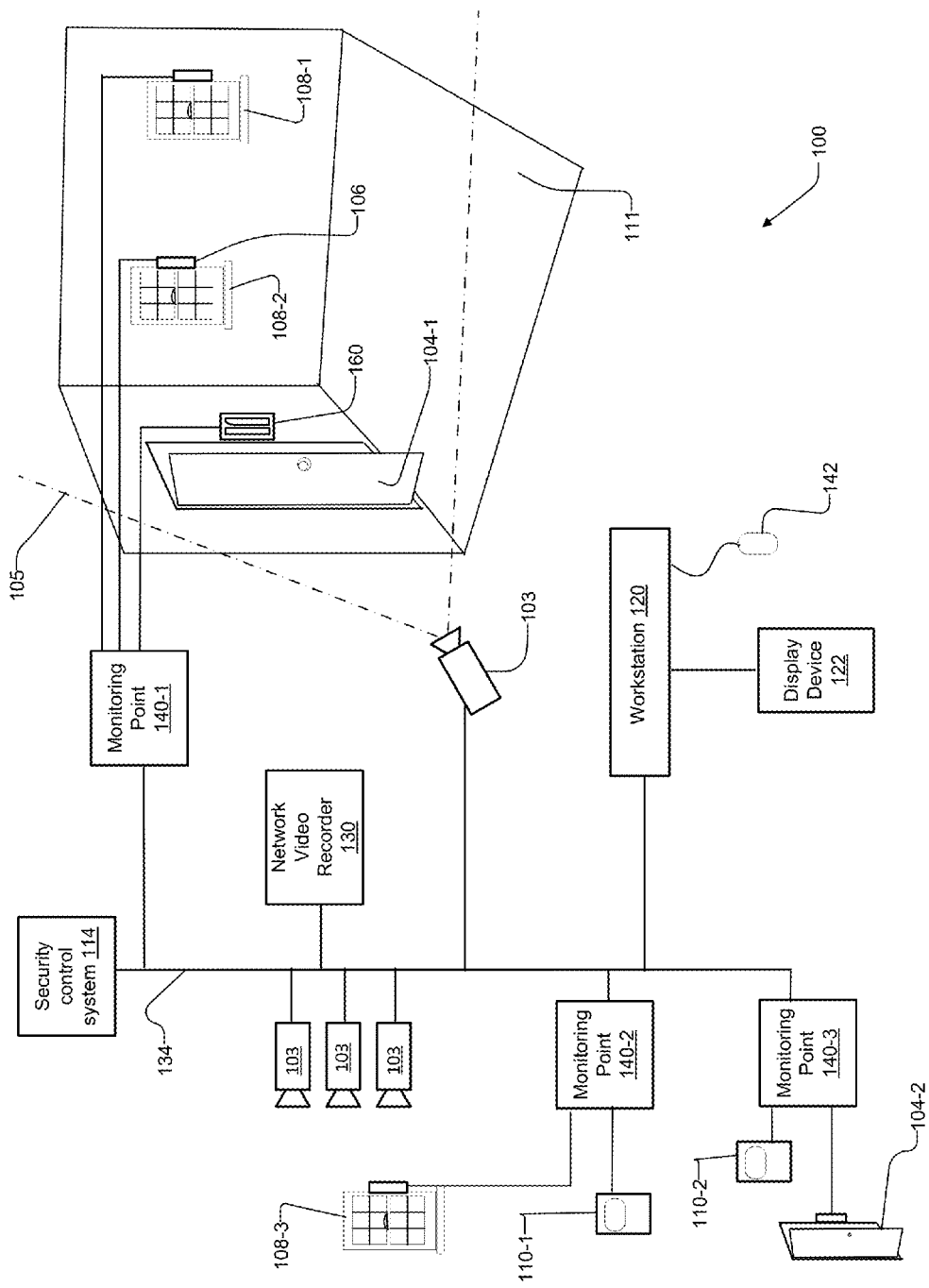
FIG. 1 is a schematic diagram of a networked security system with security devices.

FIG. 1 shows a networked security system 100. The networked security system 100 has security devices such as a network video recorder 130, video cameras 103, and monitoring points 140 that connect to a security network 134. The networked security system 100 also utilizes other security devices such as motion sensors 110, key card readers 160, and security sensors 106 that connect to the monitoring points 140, which in turn connect to the security network 134. The networked security system 100 also has a security control system 114 connected to the security network 134 for receiving status information sent from the security devices. A workstation 120 connected to the security network 134 manages the components that connect to the security network 134. The workstation 120 has a display device 122 for displaying status information from the security devices, typically via a graphical user interface, and a pointing device such as a mouse 142 or touchscreen for indicating and selecting objects displayed in the graphical user interface on the display device.

Security devices in the networked security system 100 span a range of sophistication, from simple security sensors 106 and motion sensors 110 that monitor windows 108 and doors 104, to more complex devices such as video cameras 103 running operating systems software. All security devices, however, have a way of communicating their status information so that an operator at the workstation 120 can manage and display the security devices from management software installed on the workstation 120. Operators access the management software from user interfaces that are displayed on the display screen 122.

The security sensors 106 and motion sensors 110 typically transmit different voltage levels associated with different status information. The monitoring points 140 are multiplexing devices, which can accept input from many security sensors 106, and motion sensors 110. The outputs of security sensors 106 and motion sensors 110 are wired to the input of the monitoring points 140. Monitoring points 140 allow communications between security sensors 106, motion sensors 110 and the security network 134. Monitoring points 140 provide the communications by translating the voltage signals sent from the security sensors 106, and motion sensors 110 into status information suitable for transmission over the security network 134.

In the illustrated example, one of the video cameras 103 is monitoring a room 111 that is fully within the field of view 105 of the video camera 103. The security sensors 106 for windows 108-1 and 108-2, and the key card reader 160 for door 104-1 connect to monitoring point 140-1. The monitoring point 140-1 connects to the security network 134. The networked security system 100 can support multiple security devices at different physical locations as long as the security devices are connected to the security network 134. As a result, FIG. 1 also illustrates window 108-3 and motion sensor 110-1 connected to monitoring point 140-2, and door 104-2 and motion sensor 110-1 connected to monitoring point 140-3. Monitoring points 140-2 and 140-3 then connect to the security network 134.

Figure 2:
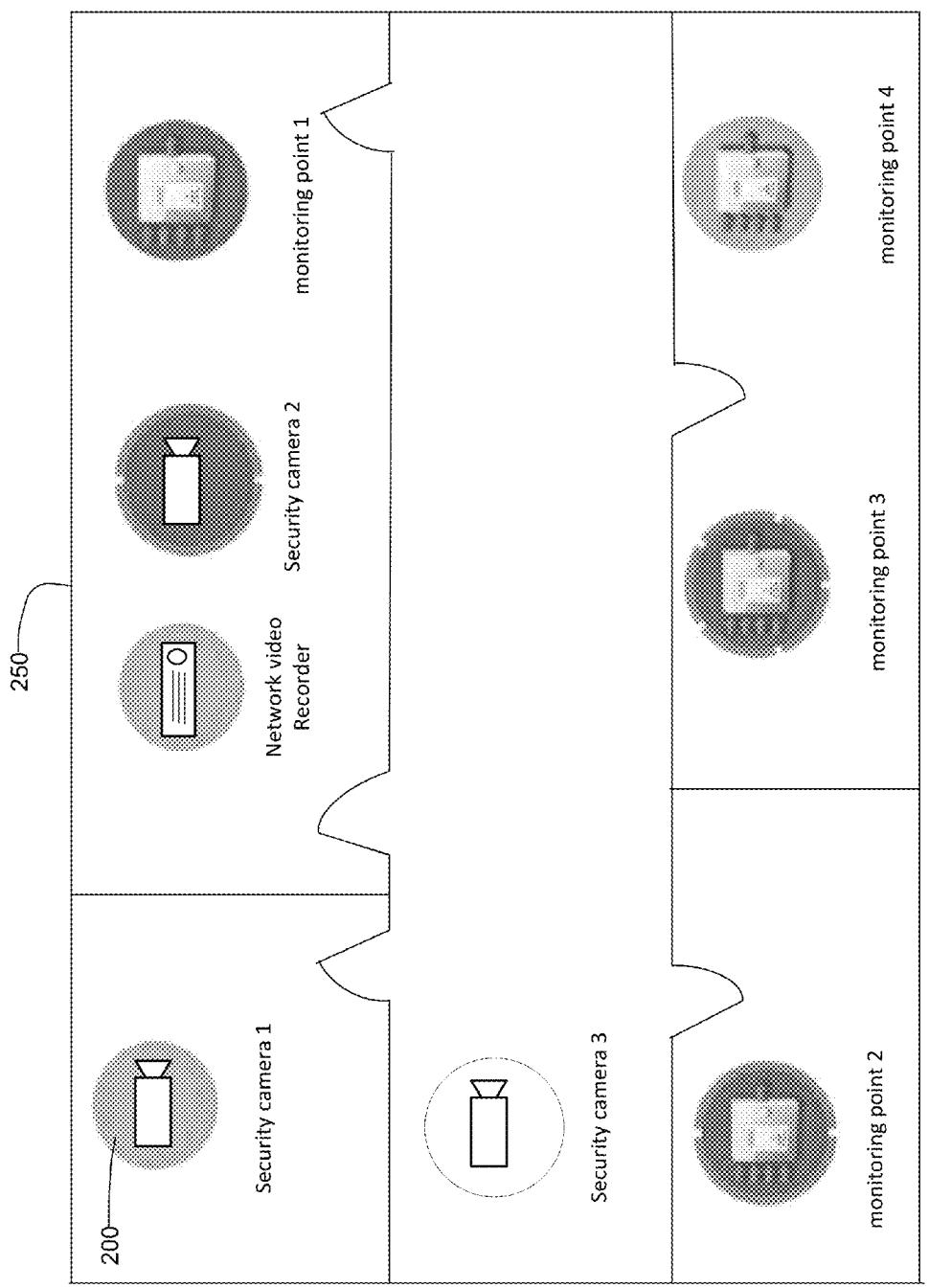
FIG. 2 is an exemplary topology map graphical user interface displayed on a display device of a security system, showing a virtual floor plan for a monitored area, and icons associated with security devices located within the monitored area, according to the present invention.

FIG. 2 shows an exemplary topology map 250 of a graphical user interface displayed on a display device of a security system. The topology map 250 is typically one window of the graphical user interface for managing the security devices in the security system. Typically, the topology map 250 is displayed on the display device 122 of the workstation 120. The topology map 250 includes icons 200 associated with security devices. The icons are superimposed upon a virtual floor plan for an area monitored by the security system. The topology map 250 provides a visual reference point for the locations of all security devices in a monitored area. The topology map 250 also provides a single point of reference for identifying status information from the security devices, and for managing the security devices. By selecting an icon 200, an operator can gain access to details for that security device.

FIGS. 3A, 3B, and 3C are schematic diagrams that illustrate icons 200 according to principles of the present invention. The icons 200 include different visual elements, and associate the display of these elements with status information from the security devices. The status information includes state information and alert information. Different visual information is associated with state information and alert information from security devices in the icons 200. In this way, operators can determine state information and alert information from a device by viewing its associated icon.

FIG. 3A shows a schematic of an icon according to principles of the present invention. Icon 200-1 includes an inner device state region 240, an inner status region 210, and an outer alert region 212. The device state region 240 preferably includes an image associated with a security device, a video camera for icon 200-1, in the illustrated example. The status region 210 is preferably additionally used to indicate operational state information about the security device, such as if the security device is online or offline. The status region 210 can be used to display status information from the security device, but preferably indicates security device operational state information. In one implementation, the absence of color in status region 210 indicates that the security device is offline, the color blue indicates that the security device is operational without problems, and the color red indicates that an alert condition exists on the security device that is causing the security device to send alert information.

The alert region 212 is used to display different features associated with alert information from the security devices. Preferably, the features are displayed as alert segments 214 as depicted in FIG. 3C, but the features can also be displayed as icons as in FIG. 8B. The alert segments 214 can be presented as arcs or lines, or as any other graphical element with a segmented presentation that visually sets features apart from one another within the alert region 212. In another example, as depicted in FIG. 8B, the features can be displayed as icons, the images of which represent the alert information.

In one example, as depicted in FIGS. 3B and 3C, the status region 210 of icons is filled with the color red when the associated security device sends any alert information. For alert information comprising only one alert, FIG. 3B illustrates the associated icon 200-2. With only one alert, icon 200-2 displays no features in the alert region 212, and the operator associates the display of an icon such as 200-2 as sending a single alert.

For alert information comprising two or more alerts, FIG. 3C illustrates one example of an associated icon 200-3. Icon 200-3 displays a separate alert segment 214 for each alert within the alert information, in this case, for two alerts. The icons have alert segments 214-1 and 214-2 that display in response to the alert information from the security devices. Icon 200-3 displays arcs for the alert segment 214, with color red and annunciation "blink." The "blink" annunciation makes the display of the alert segments 214 visually distinct from the rest of the Icon 200-3. For purposes of illustration, the alert segments 214-1 and 214-2 are displayed with different shading than that of the status region 210 to simulate the "blink" annunciation.

Figure 4A:
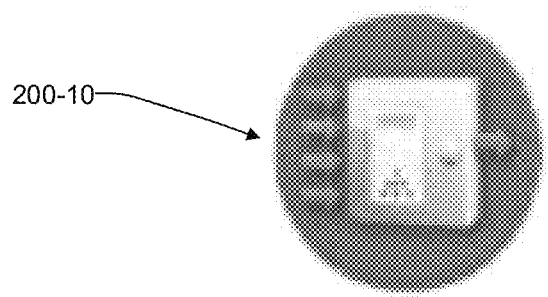
FIGS. 4A, 4B, and 4C are exemplary images of icons, including a preferred embodiment for presenting different features associated with alert information and tooltip display of alert information details of a graphical user interface displayed on a display device.
Figure 4B:
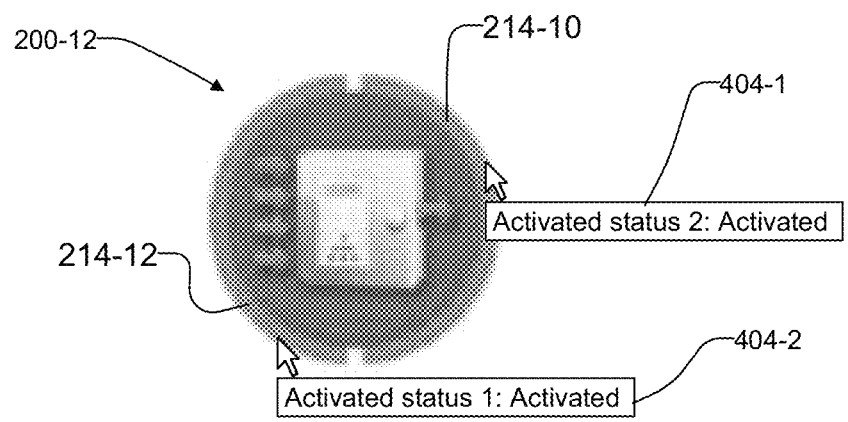
Figure 4C:
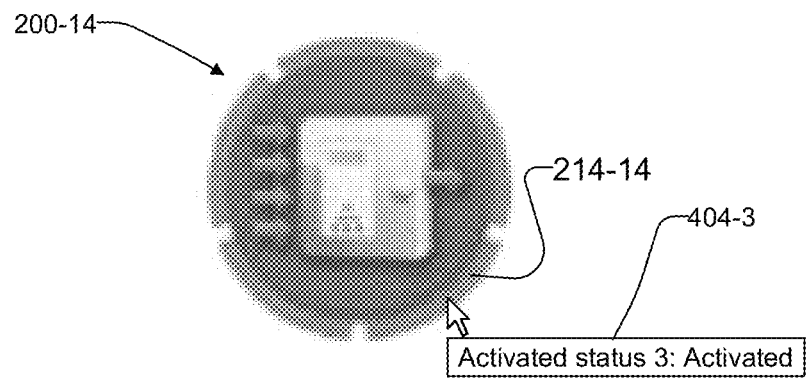

FIGS. 4A, 4B, and 4C display exemplary images of icons associated with security devices including a preferred embodiment for presenting different features associated with alert information, and display of tooltips for revealing detail of alert information in response to indication of the icons by a pointing device.

FIGS. 4A, 4B, and 4C display icons 200 associated with a monitoring point device 140. FIG. 4A displays icon 200-10 in association with a single alert from its monitoring point device 140. FIG. 4B displays icon 200-12 in association with the display of two alerts from its monitoring point device 140. FIG. 4C displays icon 200-14 in association with the display of five alerts from its monitoring point device 140.

FIGS. 4B and 4C also illustrate how the details of alert information associated with a security device are displayed in response to a user indicating the icons 200. Compared to selection of the icons, which opens child windows onto the display screen and provides the user with access to a potentially large amount of data displayed on the screen, indication of the icons is a more light-weight, focused approach to displaying data.

One example of displaying details of the alert information from user indication of the icons is by displaying the details in a tooltip 404 displayed on the display device 122. For FIGS. 4B and 4C, the tooltip 404 is displayed in response to a pointing device hover operation over an individual alert segment 214 displayed for a particular alert in the alert information. For icon 200-12, tooltip 404-1 is displayed in response to a user indication of alert segment 214-10, revealing the details of name "Activated status 2" and alert status "Activated" for the alert. Tooltip 404-2 is displayed in response to a user indication of alert segment 214-12, revealing the details of name "Activated status 1" and alert status "Activated" for the alert. For icon 200-14, tooltip 404-3 is displayed in response to a user indication of alert segment 214-14, revealing the details of name "Activated status 3" and alert status "Activated" for the alert.

Figure 5:
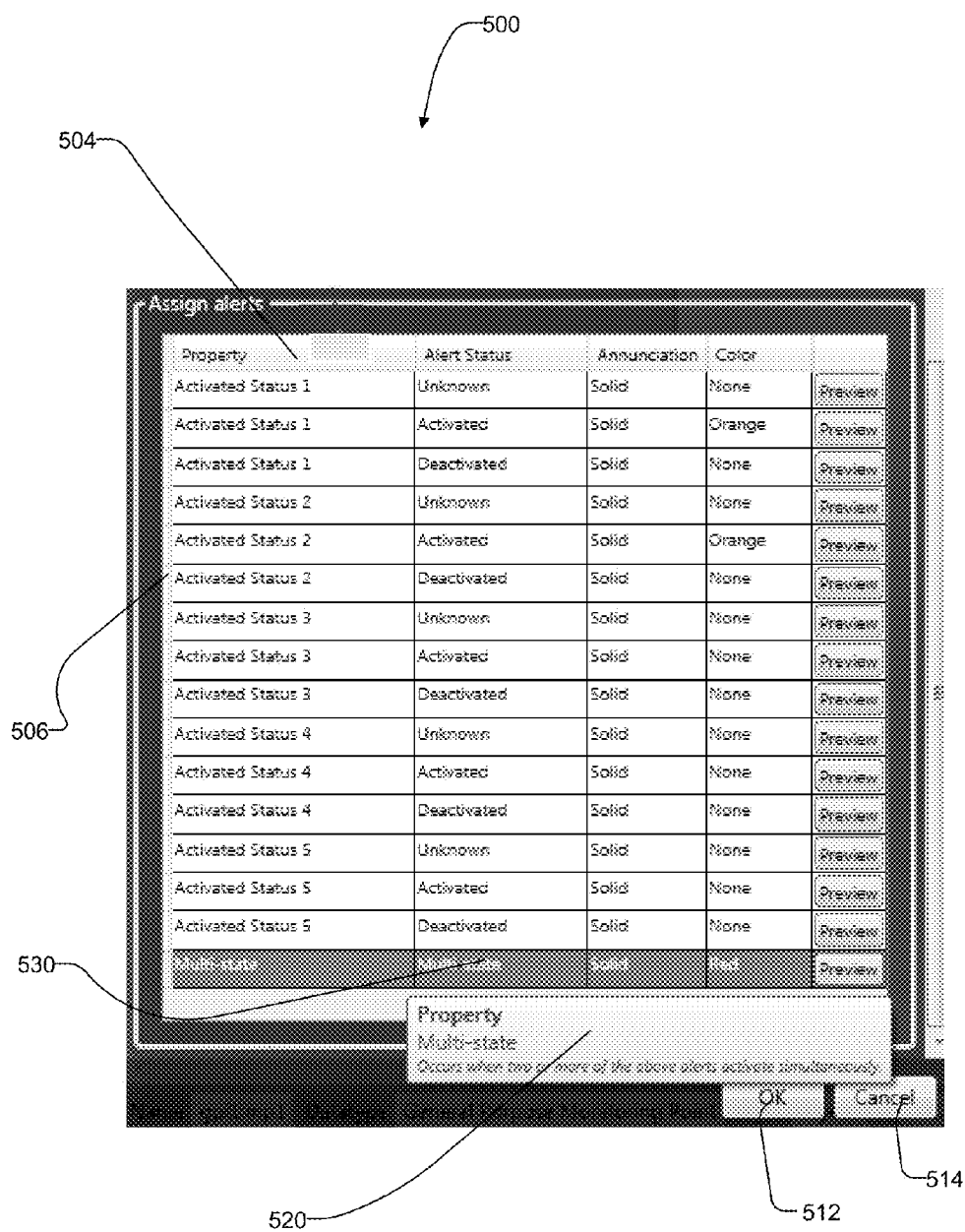
FIG. 5 displays a graphic of an icon editor dialog box for configuring alert information associated with icons for the security devices.

FIG. 5 displays a graphic of an icon editor dialog 500 for configuration of alert information associated with icons for the security devices. The operator uses the icon editor dialog 500 to assign alert information to an icon, and configure the attributes of the alert information. The read-only attributes of alert information are the name of an alert property, and its alert status value. The attributes that an operator configures for alert information are its annunciation, and color values. Example values for alert status are "unknown," "activated," and "deactivated." Example values for Annunciation are "solid," "strobe," and "blink." Example colors are "blue," "red," "orange," and "none."

The operator assigns an alert, also known as an alert property 504, to the list of supported alert information in the assigned alerts table 506 for a security device. The user has selected table entry "Multi-state," or multi-state alert 530. The multi-state property 530, or multistate alert, is a special alert that the icon editor dialog 500 automatically makes available for security devices which support two or more alerts in their alert information.

When two or more alerts that comprise the alert information are active at the same time on a security device, icons 200 display the status region 210 of the icons using the settings of the multi-state alert 530. Icon editor tooltip 404 is displayed in response to a pointing device hover over the entry, displaying more information about the alert property. The operator accepts their changes via the OK button 512, or cancels their changes via cancel button 514.

Figure 6:
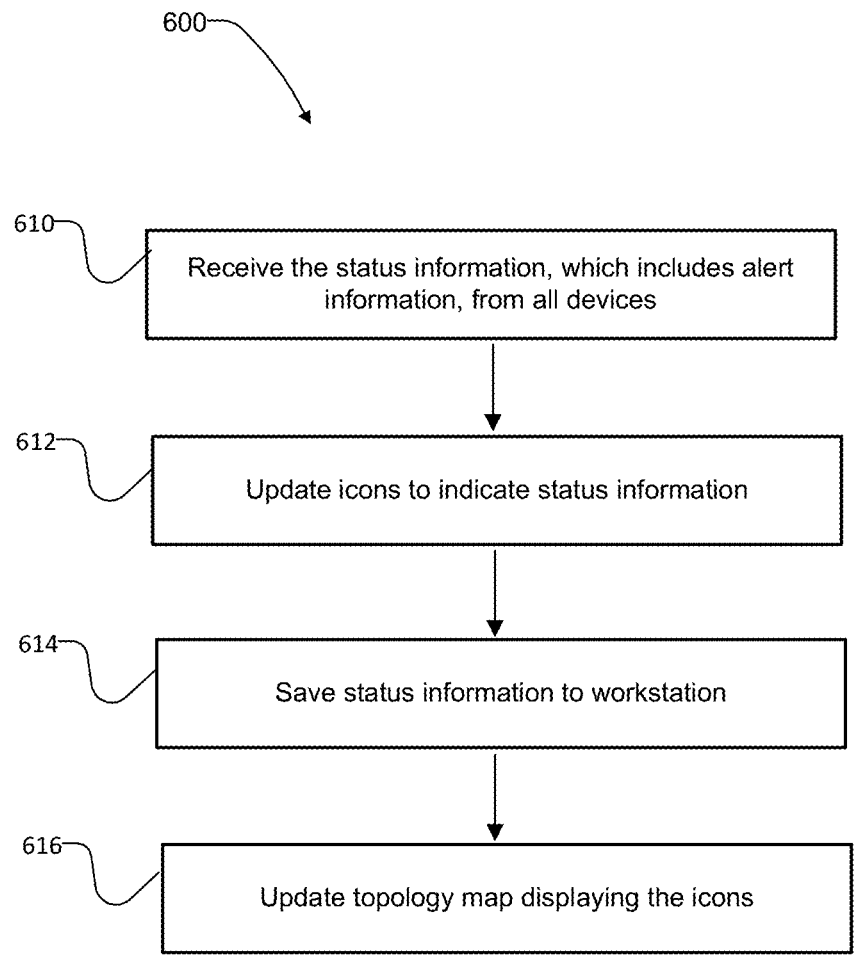
FIG. 6 is a flow diagram showing workstation receiving status information from security devices and updating a topology map.

FIG. 6 shows a method 600 for a workstation receiving status information from security devices and updating a topology map. In step 610, the workstation receives the status information, which includes alert information, from all devices. The workstation in step 612 updates the display of the icons to indicate the status information. Then, in step 614, the workstation saves the status information. In step 616, the workstation updates the topology map displaying the icons.

Figure 7:
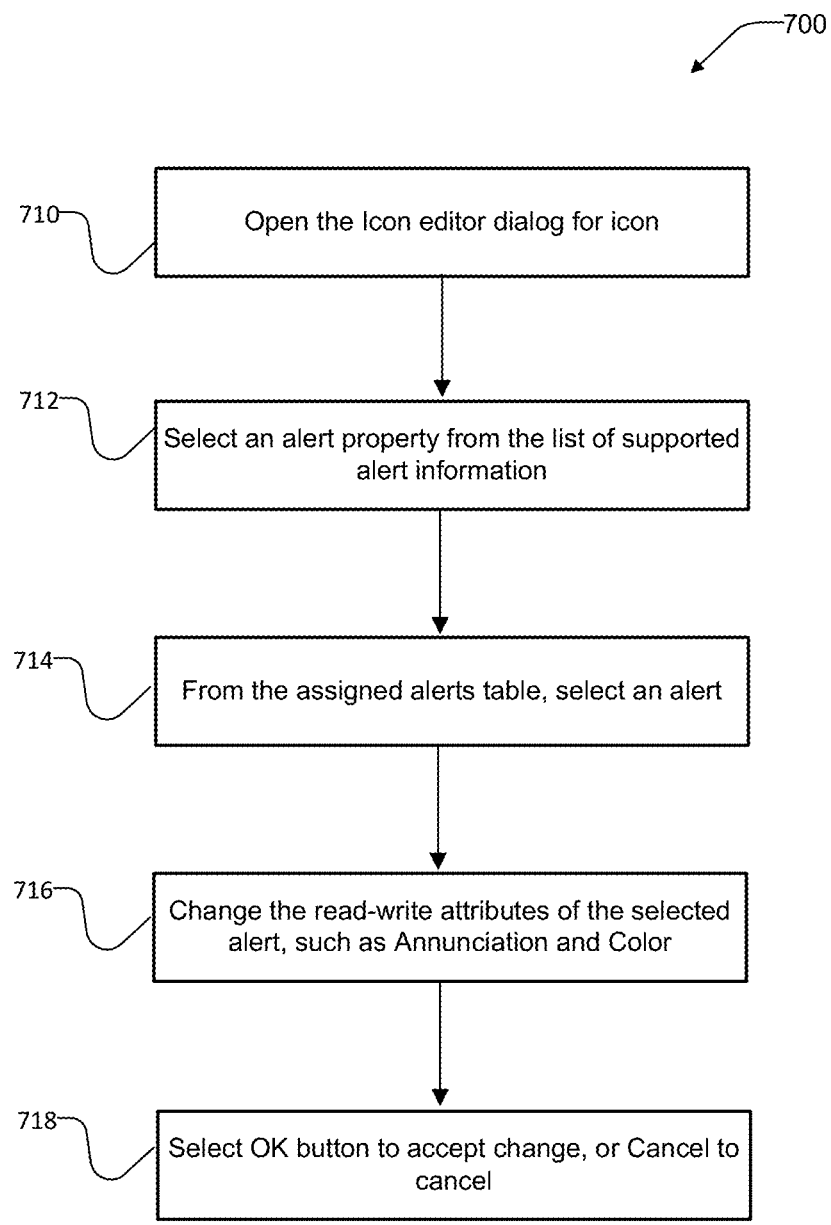
FIG. 7 is a flow diagram showing the configuration of alert information associated with a security device using the icon editor dialog box from FIG. 5.

FIG. 7 shows a method 700 for configuring alert information associated with a security device using the icon editor dialog 500 from FIG. 5. In step 710, the operator opens the icon editor dialog 500 for the icon. In step 712, the operator selects an alert property from the list of supported alert information in the assigned alerts table. In step 714, from the assigned alerts table, the operator selects an alert. In step 716, the operator changes the read-write attributes of an alert, such as annunciation and color. In step 718, the user selects OK to accept changes, or Cancel to cancel the changes.

Figure 8A:
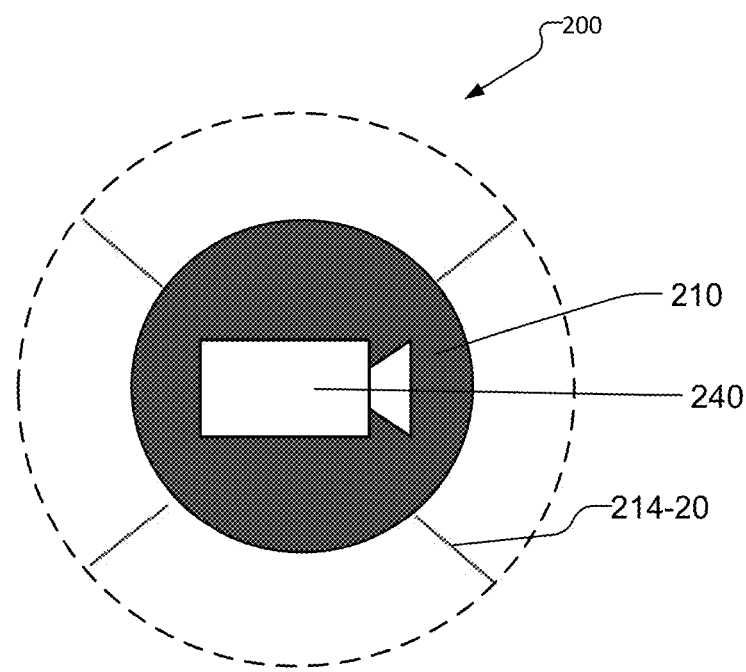
FIGS. 8A and 8B illustrate different features of icons associated with alert information.
Figure 8B:
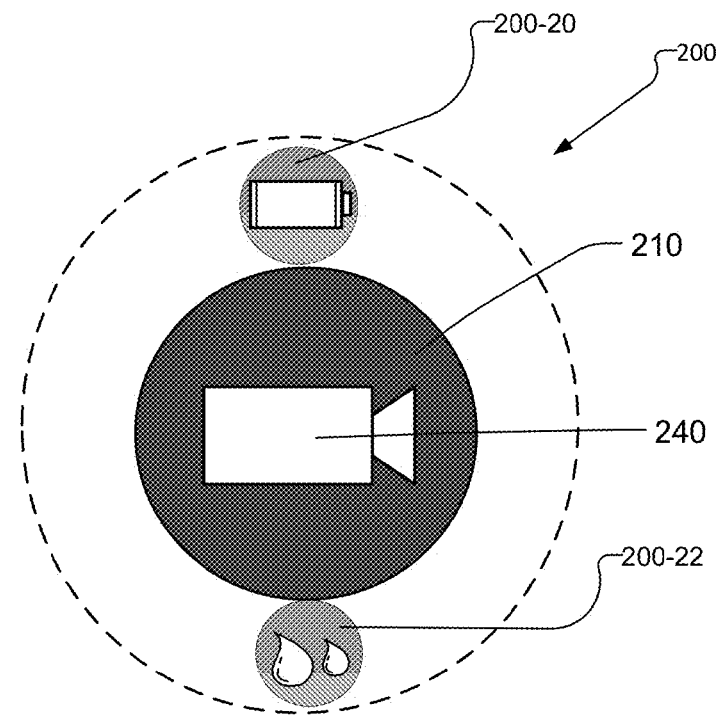

FIGS. 8A and 8B illustrate other examples of icons 200 for presenting different features associated with alert information. FIGS. 8A and 8B display icons with the device state region 240 associated with a video camera 103. FIG. 8A displays an icon with four active alerts comprising its alert information. The displayed alert segments 214, such as 214-20, are lines, presented in the alert region 212 in a fashion that radiates away from the center of the icon towards the outer edge of the alert region 212. FIG. 8B displays the features associated with alert information as icons, such as icon 200-20 associated with a low-battery indication alert and icon 200-22 associated with a video camera lens moisture alert.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:
a security network;
security devices that transmit status information via the security network; and
a display device that presents the status information using different icons associated with each type of the security devices, wherein the icons include multiple graphic features for indicating different alert information from the associated security devices, and wherein details of the alert information from the associated security devices are presented on the display device in response to a user indicating individual ones of the graphic features of the icons on the display device, wherein the user indication is made by operating a pointing device to hover over the graphic features of the icons and the details of the alert information represented by the indicated graphic features for the associated security devices are presented in a tooltip displayed on the display device.

2. The security system of claim 1, wherein the security system further comprises;
a workstation that receives the status information over the security network and presents a user interface, including the icons, via the display device.

3. The security system of claim 1, wherein the security devices include one or more key card readers, network video recorders, video cameras, monitoring points, and door sensors.

4. The security system of claim 1, wherein the icons include inner status regions for displaying the status information from the associated security devices.

5. The security system of claim 1, wherein the multiple graphic features of the icons are displayed in outer alert regions for displaying the alert information.

6. The security system in claim 1, wherein the multiple graphic features of the icons are alert segments.

7. The security system in claim 1, wherein the multiple graphic features of the icons are icons, images of which represent the alert information.

8. The security system of claim 1, wherein the status information comprises:
   security device state information; and
   the alert information.

9. The security system of claim 1, wherein the alert information comprises:
   a name; and
   an alert status.

10. A graphical user interface for a security system displayed on a display device, the graphical user interface comprising:
   a topology map showing a security network; and icons associated with security devices on the security network, wherein different icons are displayed for each type of the security devices, and wherein the icons include multiple graphic features for indicating different alert information from the associated security devices, and wherein details of the alert information from the associated security devices are presented on the display device in response to a user indicating individual ones of the graphic features of the icons on the display device, wherein the user indication is made by operating a pointing device to hover over the graphic features of the icons, and the details of the alert information represented by the indicated graphic features for the associated security devices are presented in a tooltip displayed on the display device.

11. The graphical user interface of claim 10, wherein the icons include:
   inner status regions for displaying the status information from the associated security devices.

12. The graphical user interface of claim 10, wherein the multiple graphic features of the icons are displayed in outer alert regions for displaying the alert information.

13. The graphical user interface of claim 12, wherein the multiple graphic features of the icons are alert segments.

14. The graphical user interface of claim 10, wherein the multiple graphic features of the icons are icons, images of which represent the alert information.

15. The graphical user interface of claim 10, wherein the alert information comprises:
   a name; and
   a value.

16. A method for presenting status information from security devices in a security system, the method comprising:
   displaying different icons associated with each type of the security devices on a display device; and
   presenting the status information using the icons, wherein the icons include multiple graphic features for indicating different alert information from the associated security devices, and wherein details of the alert information from the associated security devices are presented on the display device in response to a user indicating individual ones of the graphic features of the icons on the display device, wherein the user indication is made by operating a pointing device to hover over the graphic features of the icons, and the details of the alert information represented by the indicated graphic features for the associated security devices are presented in a tooltip displayed on the display device.

17. The method of claim 16, further comprising displaying the icons on a topology map on the display device.

18. The method of claim 16, further comprising displaying the status information in inner status regions of the icons.

19. The method of claim 16, further comprising displaying the alert information in outer alert regions of the icons.

20. The method of claim 19, further displaying the multiple graphic features of the icons as alert segments.

21. The method of claim 16, further displaying the multiple graphic features of the icons as icons, images of which represent the alert information.

* * * * *